United States Patent [19]

t'Sas

[11] Patent Number: 4,845,207

[45] Date of Patent: Jul. 4, 1989

[54] 3-ALKOXY-2-HYDROXYPROPYLHYDROX-YETHYLCELLULOSE AND BUILDING COMPOSITION CONTAINING THE SAME

[75] Inventor: Harald E. t'Sas, The Hague, Netherlands

[73] Assignee: Aqualon Company, Wilmington, Del.

[21] Appl. No.: 63,568

[22] Filed: Jun. 17, 1987

[51] Int. Cl.$^4$ .................... C08B 11/08; C08B 11/193
[52] U.S. Cl. ................................................. 536/91
[58] Field of Search ........................................ 536/91

[56] References Cited

U.S. PATENT DOCUMENTS

| | | | |
|---|---|---|---|
| 3,091,542 | 5/1963 | Anderson | 106/188 |
| 3,272,640 | 9/1966 | Geurden | 106/131 |
| 3,435,027 | 3/1969 | Desmarais et al. | 536/66 |
| 4,009,329 | 2/1977 | Arney et al. | 536/91 |
| 4,065,319 | 12/1977 | Desmarais | 106/93 |
| 4,228,277 | 10/1980 | Landoll | 536/90 |
| 4,243,802 | 1/1981 | Landoll | 536/91 |
| 4,352,916 | 10/1982 | Landoll | 526/200 |
| 4,485,089 | 11/1984 | Leipold | 424/49 |
| 4,501,617 | 2/1985 | Desmarais | 106/93 |
| 4,558,079 | 12/1985 | Desmarais et al. | 524/43 |
| 4,584,189 | 4/1986 | Leipold | 424/54 |
| 4,629,743 | 12/1986 | Hong | 521/57 |
| 4,654,085 | 3/1987 | Schinski | 106/93 |

FOREIGN PATENT DOCUMENTS 281360  7/1988  European Pat. Off. .

OTHER PUBLICATIONS

English Language Abstract of Japanese Patent Application 62-17059.

E. D. Klug, "Some Properties of Water-Soluble Hydroxyalkyl Celluloses and Their Derivatives", J. Polymer Sci.: Part C, No. 36, pp. 491–508 (1971).

*Primary Examiner*—John Kight
*Assistant Examiner*—Frederick Krass
*Attorney, Agent, or Firm*—Mark D. Kuller

[57] ABSTRACT

A new nonionic, water-soluble cellulose ether, i.e., 3-alkoxy-2-hydroxypropylhydroxyethyl cellulose radical wherein alkyl moiety is a straight or branched chain alkyl group containing 1 to 10 carbon atoms, and a building composition based on hydraulic or synthetic binder containing the new nonionic, cellulose ether are disclosed. The building composition has superior physical properties as compared to prior compositions containing other cellulose derivatives.

21 Claims, No Drawings

3-ALKOXY-2-HYDROXYPROPYLHYDROXYE-THYLCELLULOSE AND BUILDING COMPOSITION CONTAINING THE SAME

This invention relates to a novel nonionic, water-soluble cellulose ether and a new building composition containing the same. Specifically, it relates to 3-alkoxy-2-hydroxypropylhydroxyethylcellulose wherein the alkyl moiety is a straight or branched chain alkyl group containing 1 to 10 carbon atoms, and a building composition based on hydraulic and synthetic binders containing the same. The building composition has improved characteristics and properties as compared to prior building compositions.

By "building composition" reference is made to members of the class of construction materials exemplified by concrete, tile cements and adhesives, projection plasters, stuccos based on cement and synthetic binders, ready mixed mortars, manually applied mortars, underwater concrete, joint cement, crack fillers, floor screeds, and adhesive mortars. These compositions are essentially Portland cements, Plaster of Paris or vinyl copolymers containing functional additives to impart characteristics required for various construction applications. Controlling the water ratio, i.e., the point at which optimum application properties are obtained, in these compositions is therefore of great importance.

Lime was once the preferred material for controlling the water ratio in building compositions. Today nonionic cellulose ethers have been given this role, as they improve water retention characteristics and other physical properties such as workability, consistency, open time, tack, bleeding, adhesion, set time, and air entrainment.

Although most commercially available nonionic, water-soluble cellulose ethers find application in such building systems, those which have a hydrophobic character have found the broadest acceptance. Their positive influence on open time, i.e., the time during which a wet product remains usable or reworkable, and consistency makes them a preferred material. However, no presently available nonionic, water-soluble cellulose ether derivative has the optimum combination of properties for use in building compositions.

Hydroxyethyl cellulose (HEC), which is the most hydrophilic, nonionic water-soluble cellulose ether, has a very positive influence on water retention and workability. However, pastes made with HEC frequently have a tendency to run when applied on a vertical plane.

The more hydrophobic methylcellulose (MC) entrains air into the paste when mixed with water, resulting in a less dense paste with good consistency and open time. The less pseudoplastic behavior of this cellulosic gives pastes good stand-up, but the workability of such pastes is not as good as that of pastes made with HEC. A serious disadvantage of MC is its decreased solubility at elevated temperatures. This often causes consistency problems with projection plaster in summer.

In view of the cited shortcomings, attempts have been made to modify MC with hydrophilic groups and HEC with hydrophobic groups.

The performance of modified MC products containing small amounts of the hydroxyalkyl substituents has not been found to be significantly improved by hydrophilic groups such as hydroxyethyl and hydroxypropyl groups. HEC modified with hydrophobic groups such as benzyl-, phenyl-, and hydroxypropyl groups also fell short of expectations and, in addition, could not be manufactured economically. Moreover, the hydrophobically modified cellulose ether derivatives, modified with the long chain alkyl groups described by Landoll in U.S. Pat. Nos. 4,228,277 and 4,352,916 showed no better performance than a hydroxypropyl modified HEC.

It has been found that 3-alkoxy-2-hydroxypropylhydroxyethylcellulose imparts excellent water retention, workability, consistency, appearance, open time and air content, as well as adhesion while avoiding the disadvantages cited above. Accordingly, this invention is directed to a novel 3-alkoxy-2-hydroxypropylhydroxyethylcellulose wherein the alkyl moiety is a straight or branched chain alkyl group containing 1 to 10 carbon atoms. Further, this invention is directed to a novel building composition comprising, based on the total solids phase of the dry composition, from about 2 to about 99 wt. % of at least one hydraulic or synthetic binder, up to about 95 wt. % of at least one filler, and from about 0.5 to about 5 wt. % of at least one of the novel 3-alkoxy-2-hydroxypropylhydroxyethylcellulose.

The 3-alkoxy-2-hydroxypropylhydroxy-ethylcellulose of this invention is substantially completely soluble in water at ambient temperature.

The HEC which is modified to function in this invention is a commercially available material. Suitable commercially available materials are marketed by the Aqualon Group of Wilmington, Del. U.S.A. under the trademark Natrosol. Typically, the 3-alkoxy-2-hydroxypropylhydroxy-ethylcellulose employed in this invention has a hydroxyethyl molar substitution (M.S.) (The number of moles of hydroxyethyl substituent per cellulosic anhydroglucose unit in the cellulose molecule) of about 1.5 to 3.5 and a degree of polymerization of about 1500 to about 4000.

The alkylglycidyl radical is generally contained in an amount of about 0.05 to about 50 wt. %, preferably about 0.1 to about 25 wt. %, based on the dry weight of the substituted polymer. Preferably the alkyl group of the 3-alkoxy-2-hydroxypropyl group is a straight chain alkyl group having 2 to 6 carbon atoms. Exemplary modifying radicals are methyl-, ethyl-, propyl-, butyl-, pentyl- and 2-ethylhexylglycidyl ether.

The 3-alkoxy-2-hydroxypropylhydroxyethylcellulose of this invention can be prepared in essentially the same manner as described by Landoll in U.S. Pat. Nos. 4,228,277 and 4,352,916. Briefly, modification can be effected by slurrying the hydroxyethyl cellulose in an inert organic diluent such as a lower aliphatic alcohol, ketone, or hydrocarbon and adding a solution of alkali metal hydroxide to the resultant slurry at low temperature. When the ether is thoroughly wetted and swollen by the alkali, an alkylglycidyl ether is added and the reaction is continued with agitation until complete. Residual alkali is then neutralized and the product is recovered, washed with inert diluents, and dried.

The following examples demonstrate preparation of the 3-alkoxy-2-hydroxypropylhydroxyethylcellulose of this invention, wherein, all parts, percentages, etc., are by weight, unless otherwise noted.

PREPARATION EXAMPLE 1

A slurry of 80 parts by weight of high viscosity hydroxyethyl cellulose (M.S. 2.5; 1% solution viscosity measured in a Brookfield LVF viscometer of 3400 mPas) in a mixture of 859 parts t-butanol and 113.4 parts water was prepared. The slurry was degassed by sparging with $N_2$. To this was added 2.6 parts of aqueous 50% NaOH. The temperature of the slurry was maintained at ambient temperature by removing the heat generated due to addition of NaOH. This slurry was agitated under a nitrogen atmosphere for 45 minutes. Then, 24 parts of n-butylglycidyl ether was added. The temperature was raised to 90° C. over one hour and maintained for two hours. The mixture was cooled down to 25° C. and neutralized with aqueous 65% nitric acid. The reaction liquid was removed and the product was washed and hardened with 80/20 (twice), 84/10, 88/12, 92/8, 96/4 and 98/2 acetone/water mixtures. The product was filtered and dried in a ventilated oven for 60 minutes. The resulting product had a, 3-butoxy-2-hydroxypropyl D.S. and a cloudpoint of 70° C.

PREPARATION EXAMPLE 2

A slurry of 80 parts by weight of high viscosity hydroxyethyl cellulose (M.S. 3.2) in a mixture of 173.2 parts pure, acetone and 15.6 parts $H_2O$ was prepared. This slurry was thoroughly degassed by purging with $N_2$. Then, a mixture of 3.8 parts aqueous 50% NaOH and 0.076 parts of $H_2O$ was added under cooling. The slurry was allowed to swell under agitation for 15 minutes under nitrogen pressure. Then, 15.3 parts of n-butylglycidyl ether was added. The reactor was pressurized and heated to 90° C. in about one hour. This temperature was maintained for four hours. After cooling to about 40° C., the reaction mixture was neutralized with $HNO_3$ (65%) and acetic acid. The reaction liquid was removed and the remaining slurry was washed three times with 200 parts of acetone (96%), filtered and dried at 60° C. in a ventilated oven. The resulting product had a 3-butoxy-2-hydroxypropyl D.S. of 0.27 and a cloudpoint of 78° C.

PREPARATION EXAMPLE 3

The procedure as given in example 1 was repeated except that 20 parts 2-ethylhexylglycidyl ether was used instead of the n-butylglycidyl ether and the reaction was allowed to proceed for four hours at 75° C. The resulting product had a 3-(2-ethylhexyloxy)-2-hydroxypropyl D.S. of 0.29 and a cloudpoint of 74° C.

The solids component of the building compositions in which the 3-alkoxy-2-hydroxypropylhydroxy ethylcellulose can be incorporated consists mainly of a binder and fillers. The binder can be a hydraulic binder such as Portland cement or Plaster of Paris, a dispersion such as a vinylacetate ethylene copolymer dispersion, or, in some cases, a combination thereof. The amount of binder can range from about 2 to almost 100 wt. %, i.e., up to about 99 wt. %, based on the total solid content of the composition. Exemplary fillers include gravel, sand, silica, dolomite, gypsum, chalk, limestone and combinations thereof. In cases where lower weights are required light weight extenders such as perlite, vermiculite and polystyrene can be used. The fillers can be used in amounts of up to 95 wt. %, based on the total solids content of the composition, but need not be present. The precise ratio of filler to binder and the selection of filler are determined by the application intended for a specific building composition formulation.

The 3-alkoxy-2-hydroxypropylhydroxy ethylcellulose is typically included in amounts from about 0.05 to about 50 wt. %, preferably from about 0.1 to about 25 wt. %, based on the weight of the total solids content of the composition.

In addition, other additives such as set retarders, set accelerators, plasticizers, surface active agents, defoamers, solvents, coalescing agents, preservatives, inorganic and organic fibers, and water-soluble polymers such as polyacrylamides, starch ethers and guar derivatives, may be used, typically in amount of from about 0.001 to about 5 wt. %, based on the total solids of the composition.

The solids phase is slurried or dispersed in water to form the concrete, cement, or adhesive or other construction material. The specific amount of water will be determined by the intended application. For applications such as concrete, relatively large volumes of water are used compared to, e.g., joint cements which are required to be much more viscous.

Modified HEC containing large amounts of substituents, i.e., having high substitution levels of alkylglycidyl modifier, have a cloudpoint (the temperature at which a 1% solution of the polymer starts to become opaque when slowly heated). The cloudpoint of a polymer is indicative of its hydrophobicity. A relatively low cloudpoint is indicative of higher hydrophobicity. Polymers with lower cloudpoints would be expected to give relatively greater air entrainment and stabilization of the air in the plaster and mortars. At low substitution levels the cloudpoint does not occur. Products having a cloudpoint perform particularly well in tile cements and plaster based glues. Products that do not have cloudpoints achieve excellent results in projection plaster, cement stuccos and mortars.

This invention is illustrated in the following examples, which are exemplary and not intended to be limiting, wherein all parts, percentages, etc., are by weight and all weight percentages are based on the total weight of the solids phase of the building composition, unless otherwise indicated.

The cellulose ethers used in the examples are described in the following Table 1.

TABLE 1

| Cellulose Ethers | H.E.M.S.[1] | n-Bu.D.S.[2] | M.D.S.[3] | H.P.M.S.[4] | Cloudpoint[5] (°C.) | Viscosity[6] (mPas) |
|---|---|---|---|---|---|---|
| A. Hydroxyethyl hydroxypropyl cellulose (also "HEHPC") | 1.2 | — | — | 1.0 | >100 | 2000 |
| B. 3-butoxy-2-hydroxypropylhydroxyethylcellulose | 3.07 | 0.37 | — | — | 73 | 900 |
| C. 3-butoxy-2-hydroxypropylhydroxyethylcellulose | 3.07 | 0.37 | — | — | 72 | 1000 |
| D. 3-butoxy-2-hydroxypropylhydroxyethylcellulose | 3.1 | 0.46 | — | — | 57 | 1100 |
| E. 3-butoxy-2-hydroxypropylhydroxyethylcellulose | 2.73 | 0.266 | — | — | 78 | 1500 |
| F. 3-butoxy-2-hydroxypropylhydroxyethylcellulose | 3.38 | 0.137 | — | — | >100 | 4400 |
| G. 3-butoxy-2-hydroxypropylhydroxyethylcellulose | 3.27 | 0.047 | — | — | >100 | 3560 |
| H. 3-butoxy-2-hydroxypropylhydroxyethylcellulose | 3.07 | 0.30 | — | — | 82 | 1100 |
| P. Methyl hydroxyethyl cellulose (also "MHEC") | 0.25 | — | 1.4 | — | 68 | 1340 |
| Q. Methyl hydroxypropyl cellulose (also "MHPC") | — | — | 1.7 | 0.15 | 63 | 2300 |

TABLE 1-continued

| | Cellulose Ethers | | | | Cloud-point[5] (°C.) | Viscosity[6] (mPas) |
|---|---|---|---|---|---|---|
| | H.E.M.S.[1] | n-Bu.D.S.[2] | M.D.S.[3] | H.P.M.S.[4] | | |
| R. Methyl hydroxyethyl cellulose | 0.12 | — | 1.25 | — | 75 | 2000 |

[1]Hydroxyethyl molecular substitution.
[2]3-Butoxy-2-hydroxypropyl degree of substitution.
[3]Methyl degree of substitution.
[4]Hydroxypropyl molecular substitution.
[5]Temperature at which a 1% solution becomes opaque when heated starting at 20° C.
[6]Viscosity of a 2% solution at 25° C., measured with a Brookfield LVF viscometer.

EXAMPLES 1 TO 6

Samples 1 to 6 were simple laboratory standard tile cements. This cement was a mixture of 350 parts by weight Portland Cement, 650 parts sand and 5 parts thickener (polyacrylamide and starch ether were used in place of some of the cellulose ether in Examples 3, 4 and 5). The thickener was a cellulose ether identified in Table 1, or a mixture of such a cellulose ether and a starch ether or polyacrylamide.

A Hobart N50 mixer, as described in DIN 1164, part 7, was used to mix the tile cement.

The tile cement was prepared in accordance with DIN 18156, part 2. A dry mortar was prepared by mixing 174.1 g of Portland cement C, 323.4 g Sand M 34 (0.1 to 0.2 mm), and 2.5 g cellulose ether (polyacrylamide and starch ether were used in place of some of the cellulose ether in Examples 3, 4 and 5) in a plastic bag of about 1.5 liters and shaking it for three minutes. Water, in the amounts specified in Table 2, was poured into the bowl of the Hobart mixer. Then, the dry mortar was gradually added to the water and was mixed in the bowl for 30 seconds at low speed. Next, the paddle of the Hobart mixer was removed, the mortar adhered to the paddle and bowl was scraped off and added back into the mixture, and the paddle was reattached, all in a period of 30 seconds, and the mortar was again mixed for a period of 30 seconds. The mortar was then allowed to sit for 15 minutes and mixed once more for 15 seconds at low speed.

The amount of water used was selected for optimal appearance and consistency.

The formulations are shown in Table 2.

Appearance, workability, consistency, tack and bleeding of the final paste were evaluated visually and by mixing manually. Sag resistance with heavy tile, open time and adhesion were measured as follows.

Sag Resistance With Heavy Tile

The adhesive was applied on a horizontal concrete background notched with quadrangular teeth of 6×6×6 mm with a trowel. The adhesive was allowed to sit for 10 minutes and, then, a nonabsorbing tile of 150×150×11 mm (approx. 585 g) was placed on top of the adhesive and a pressure of 5 kg was applied for 30 seconds. The original location of the upper side of the tile was marked. Then, the concrete plate was carefully put in a vertical position. After about 30 minutes, the top side of the tile was marked and the distance between the two marks was measured to determine how far the tile had slid.

Open Time

Open time was measured based on DIN 18156, except that the tiles described below were used. The adhesive was applied on a horizontal concrete background as described above, with respect to sag resistance. After 5, 10, 15, 20, 25 and 30 minutes, respectively, an absorbing tile of 50×50 mm was placed on top of the adhesive and a pressure of 0.5 kg was applied for 30 seconds. Thirty minutes after application, the tile was removed and the residual amount of mortar adhered to the tile was observed. The time at which the adhesive residue strongly decreased was taken as the open time of the tile cement.

Determination of Adhesion

Adhesive was applied to the background as described above, with respect to sag resistance. After 10 minutes 6 absorbing tiles of 50×50 mm were placed on top of the adhesive and a pressure of 2 kg was applied for 30 seconds. The tiles were allowed to sit and then adhered tiles were stored in a horizontal position at 23° C. and 50% R.H. After 1 day and 7 days, respectively, three tiles were pulled with a Sattec adhesion tester, a hydraulic pulling device. In this test, a metal disc of 5.0 cm

TABLE 2

| | Standard Tile Cement | | | | | |
|---|---|---|---|---|---|---|
| Composition (parts by weight, dry basis) | 1 (HEHPC) | 2 (Invention) | 3 (Invention) | 4 (Invention) | 5 (MHEC) | 6 (MHPC) |
| Portland cement C[1] | 350 | 350 | 350 | 350 | 350 | 350 |
| Silica sand (0.1–0.3 mm) | 650 | 650 | 650 | 650 | 650 | 650 |
| Cellulose ether A | 5 | — | — | — | — | — |
| B | — | 5 | 3.5 | — | — | — |
| D | — | — | — | 4.8 | — | — |
| P | — | — | — | — | 4.5 | — |
| Q | — | — | — | — | — | 5 |
| Polyacrylamide[2] | — | — | — | 0.2 | — | — |
| Starch ether[3] | — | — | 1.5 | — | 0.5 | — |
| Water ratio applied[4] | 0.25 | 0.275 | 0.30 | 0.275 | 0.25 | 0.25 |

[1]A Portland cement having a compressive strength of 55 N/mm[2] after 28 days.
[2]Polyacrylamide with a 50% anionicity (Anionicity is obtained by hydrolysis of polyacrylamide; 50% anionicity means 50 mol. % hydrolysis.) and a 1% solution viscosity of 2300 mPas.
[3]Hydroxypropyl starch having a hydroxypropyl molar substitution of 0.6.
[4]Ratio of parts water (by weight)/parts dry mixture (by weight).

diameter, in the center of which there is a screwhole for connection with the tester, was placed on the tiles, the tiles were pulled, and adhesion was measured.

The results are shown in Table 3.

Workability was evaluated visually and by mixing manually. Sag resistance, skinning resistance and strength were measured as follows.

TABLE 3

| | Standard Tile Cement | | | | | |
|---|---|---|---|---|---|---|
| Property Observed | 1 (HEHPC) | 2 (Invention) | 3 (Invention) | 4 (Invention) | 5 (MHEC) | 6 (MHPC) |
| Appearance | grainy | smooth | smooth | smooth | smooth | smooth |
| Workability | fair | excellent | excellent | good | good | good |
| Consistency | heavy | firm | light | firm | fair | light |
| Tack | fair | good/excellent | excellent | good | good/excellent | good/excellent |
| Bleeding | some | slight/none | slight | none | slight/none | much |
| Sag resistance (mm) | 3.0 | 1.0 | 1.8 | 2.5 | 2.5 | 15.4 |
| Open time (min.) | 20–25 | 25 | 35–40 | 25–30 | 20–25 | 15–20 |
| Adhesion (N/cm$^2$) | | | | | | |
| after 1 day | 30 | 33 | 31 | 30 | 29 | 37 |
| after 7 days | 59 | 64 | 65 | 69 | 67 | 79 |

The data in Table 3 shows the improved results obtained using n-butylglycidyl modified hydroxyethyl cellulose per this invention. Compared with methylhydroxypropylcellulose, the cellulose ether of this invention imparts a better workability, a higher sag resistance, and a longer open time at a higher water ratio and at about the same adhesion. When blended with a starch ether, open time is even longer because the amount of water can be increased, which also improves consistency. The sag resistance still is excellent. When combined with polyacrylamide, the modified hydroxyethyl cellulose performed similarly to methylhydroxyethylcellulose. Open time, however, was longer because of the larger amount of water which could be added.

EXAMPLES 7 TO 12

These example are directed to a comparison of U.S. tile cement formulations of 3-butoxy-2-hydroxypropylhydroxyethylcellulose per this invention with hydroxypropyl hydroxyethyl cellulose and hydroxypropyl methylcellulose.

Samples 7 to 12 were prepared by mixing the dry ingredients, i.e., the Portland cement, sand and thickener (polyacrylamide was used in place of some of the cellulose ether in some of the examples) listed in Table 4, by placing them in a closed container and shaking the container. A measured amount of water was placed in a mixing vessel and the dry ingredient were added. Then, the cement was mixed with a stirring rod for about 1 minute until homogeneous consistency was obtained. A slake period of 15 minutes was allowed before testing the cement.

Sag Resistance

A layer of cement was cast on wallboard between two 1/8 inch wire rods and a 4×4 inch 200 g non-absorptive tile was pressed onto the layer. A line was drawn in the cement at the top of the tile and the wallboard was placed in a vertical position. After a measured length of time, the distance of sagging from the line to the top of the tile was measured. A distance of greater than 1/16 inch indicates that the cement was too wet and less water should have been added. If no sagging is observed at all, the cement was too dry and more water should have been used. A level of water addition which gave tile sagging of from 1/32 inch to 1/16 inch would be considered optimum.

Skinning Resistance

A layer of cement was applied to wallboard with a 1/4 inch × 1/4 inch notched trowel. Immediately after troweling a 2 inch × 2 inch absorptive tile was placed on the cement and a 1 kg weight was placed on the tile. After 5 minutes, a second, similar, tile was placed on a second area of the troweled cement and anchored with a 1 kg weight. The first tile was pulled up by hand and the surface coverage of cement was estimated. After another 5 minutes, a third, similar, tile was placed on a third area of the troweled cement and the second tile was pulled up and cement coverage was estimated. Finally, after an additional 5 minutes, the third tile was pulled up.

This test shows the resistance of "skin" formation of the thickener. The higher the amount of cement coverage on the tiles, the higher the surface adhesion of the

TABLE 4

| | U.S. Tile Cement | | | | | |
|---|---|---|---|---|---|---|
| Compostion (parts by weight, dry basis) | 7 (HEHPC) | 8 (Invention) | 9 (MHPC) | 10 (HEHPC) | 11 (Invention) (MHPC) | 12 |
| Portland White type I | 500 | 500 | 500 | — | — | — |
| Grey Portland cement | — | — | — | 400 | 400 | 400 |
| Fine sand (0.2 mm) | 400 | 400 | 400 | 450 | 450 | 450 |
| Coarse sand (0.3 mm) | 100 | 100 | 100 | 150 | 150 | 150 |
| Cellulose ether A | 5 | — | — | 5 | — | — |
| E | — | 4.5 | — | — | 5 | — |
| Q | — | — | 4.3 | — | — | 4.8 |
| Polyacrylamide[1] | — | — | 0.2 | — | — | 0.2 |
| Water ratio applied[2] | 0.25 | 0.25 | 0.25 | 0.26 | 0.26 | 0.26 |

[1]Polyacrylamide with 30% anionicity (30 mole % hydrolysis) and 0.5% viscosity of 850 mPas.
[2]Ratio of amount water (by weight)/ amount of dry mixture (by weight).

cement. Values for the first tile (termed 0 time surface adhesion ."S.A.") are normally 90 to 100%. Values for the second tile (5 min. S.A.) normally vary from 27 to 75% and third tile values are typically 0 to 25%.

Shear Strength

The shear strength, i.e., average strength after one day, was measured as follows. A 4½ inch×4½ inch tile was cut in half and was cemented together with a ⅛ inch, layer of the tile cement (surface area of 64 square inches). The cement was allowed to dry at 70° F., 50% RH, for 24 hours. Then, a vertical force was applied at a constant rate and the load recorded.

TABLE 5

| | U.S. Tile Cement | | | | | |
|---|---|---|---|---|---|---|
| Property Observed | 7 (HEHPC) | 8 (Invention) | 9 (MHPC) | 10 (HEHPC) | 11 (Invention) | 12 (MHPC) |
| Sag resistance (mm) | 8 | 2–3 | 2 | 12 | 3–4 | 2 |
| Skinning resistance[1] | | | | | | |
| 0 min. | 100 | 100 | 100 | 100 | 100 | 100 |
| 5 min. | 50 | 30 | 30 | 95 | 90 | 50 |
| 10 min. | 10 | 5 | 5 | 80 | 50 | 10 |
| Workability | fair | excellent | good | fair | excellent | good |
| Avg. strength 1 day (psi) | 190 | 220 | 210 | — | — | — |

[1]% cement adhered to tile.

Tables 4 and 5 show two series with different cements and water ratios. In the first section (examples 7 to 9), this invention (without additive) performed equally to a sample of MHPC with an additive. In the second series (examples 10 to 12), this invention (without additive) exhibited a much better skinning resistance than MHPC (with an additive). The better skinning resistance will allow more efficient working. This invention exhibited superior workability in both series. This improvement was shown by a greater degree of smoothness when troweled and the sharpness of the cement layer when notched.

EXAMPLES 13 to 15

The examples are directed to a comparison of cement stuccos. A cement stucco is a mixture of cement, sand and light weight aggregate applied to appropriate parts of buildings by means of spraying.

The formulation used in this example, wherein all parts are by weight, is shown in the following Table 6.

TABLE 6

| Component | Parts (by weight, dry composition) |
|---|---|
| Portland Cement A[1] | 180 |
| Lime (95%) | 50 |
| Silica sand (0.05–2 mm)[2] | 740 |
| Vermiculite | 20 |
| Al-silicate | 10 |
| Total Polymer (cellulose ether and polyacrylamide) | 1.6 |

[1]Standard Portland cement having a compressive strength of 35 N/mm² after 8 days.
[2]Silica sand mixture composed of 1 part by weight of a fraction of 1 to 2 mm, 5 parts by weight of a fraction of 0.1 to 1.0 mm, and 1.5 parts by weight of a fraction of 0.05 to 0.3 mm.

Dry cement stucco having the above formulation was added, with stirring at 500 rpm, to water in the ratio specified in Table 7. After addition was completed stirring was continued for 15 or 30 seconds at 800 rpm, as necessary to obtain a homogeneous mixture.

Appearance and workability were subjectively determined by visual observation and manual mixing. Water loss, air content and spreading value were measured as discussed below.

Water Loss

This test shows the amount of water loss or bleeding that a composition experiences when in contact with an absorptive surface. Excessive water loss can cause low strength and cracking of the dried stucco and, therefore, a low water loss value is desirable.

The amount of water loss was measured by stapling 10 circles of 9.0 cm no. 40 Whatman filter paper (Having, according to ASTM D981-56, a filtration rate of 75 secs. for 100 ml water. Weight was 95 g/m². Thickness 0.20 mm.) together and weighing stack. The filter paper stack was then placed on a flat surface and covered on top with an 11.0 cm no. 54 Whatman filter paper (having a filtration rate of 10 seconds for 100 ml water according to ASTM D981-56). A 2 inch diameter by 3 inch long cylinder was placed on top of this filter paper stack. The cylinder was filled to the top with wet plaster mix. After 1 minute, the cylinder and the top filter paper were removed. The filter paper stack was weighed to determine the water gain, which is expressed as water loss in grams (gms) from the plaster composition.

Air Content

The amount of air entrained in the composition was determined gravimetrically. The wet sprayable plaster mix was placed in a cylinder of known volume and lightly tapped one hundred times to remove any large air bubbles. The mix at the top of the cylinder was sawed off to give a known volume of mix. The weight of the mix was measured. Taking the specific gravity of the wet mix and the known specific gravity of the solids in the mix, the air volume of the wet mix was calculated. High air content leads to a smoother and creamier consistency and, therefore, is desired.

Spreading Value

The spreading value or flow was measured with a Hagerman flow table according to DIN 1060/DIN 18555 (which flow table is similar to the one described in ASTM C230-68T). The table was dropped through a height of 1 cm 15 times.

Spray Test

A dry mix having the formulation shown in Table 6 was poured into the container of a Putzmeister Gipsomat G78 spray machine, from which it is pushed into the mixing chamber. This mixing chamber was connected with the water works. Here the dry mix was mixed with the water and transferred by a screwpump to a 10 meter hose and sprayed through the spray nozzle at the end of the hose onto the wall surface. The time which elapsed between the first contact with water and leaving the hose through the nozzle was between 17 and 20 seconds. Successive troweling and finishing operations were carried out over the course of the next 1 to 2 hours to give a smooth finish. Spray characteristics were then subjectively determined.

TABLE 7

| | Cement Stucco | | |
|---|---|---|---|
| Property Observed | 13 (MHEC) | 14 (Invention) | 15 (Invention) |
| Laboratory tests | | | |
| Water ratio[1] | 0.265 | 0.265 | 0.265 |
| Cellulose ether R (parts) | 1.52 | — | — |
| F (parts) | — | 1.6 | — |
| G (parts) | — | — | 1.6 |
| Polyacrylamide (parts)[2] | 0.08 | — | — |
| Appearance | smooth | smooth | smooth |
| Workability | good | excellent | excellent |
| Spreading value (cm) | 15.5 | 15.5 | 15.5 |
| Paste density (g/cc) | 1.48 | 1.44 | 1.45 |
| Air stability | | | |
| Paste density | | | |
| after 5 min. | 1.50 | 1.45 | 1.47 |
| after 15 min. | 1.50 | 1.48 | 1.47 |
| after 30 min. | 1.51 | 1.49 | 1.47 |
| Flexural strength (N/mm$^2$) | 1.7 | 1.8 | 1.8 |
| Compressive strength (N/mm$^2$) | 4.7 | 4.7 | 4.8 |
| Air content (%) | 20 | 22 | 21 |
| Water loss (mg after 3 min.) | 2505 | 2325 | 2432 |
| Spray tests | | | |
| Stucco/water ratio[3] | 3.6 | 3.3 | 3.3 |
| Spraying performance | good/ excellent | excellent | excellent |
| Waterflow (l/hr.) | 335 | 350 | 350 |
| Pressure (bar) | 20 | 19–20 | 19 |
| Crack formation | none | none | none |

[1]Amount of water added (by weight)/amount of dry stucco (by weight).
[2]Nonionic polyacrylamide, 1% solution 800 mPa.
[3]Ratio of amount of dry stucco (by weight)/amount of water (by weight).

Table 7 shows that the modified hydroxyethyl cellulose of this invention improved workability and water retention. This latter property is beneficial when using highly absorptive substrates. The higher water flow possible during large scale trials improves yields of the cement stucco thereby decreasing costs.

EXAMPLES 16 TO 18

The examples are directed to a comparison of sprayable plasters. The formulation used in this example, wherein all parts are by weight, is shown in the following Table 8. The samples were prepared by adding the polymers (cellulose ether and polyacrylamide), air entraining agent and set retarder to a premixed quantity of plaster, anhydride and hydrated lime. The samples were evaluated in the same manner as described with respect to examples 13 to 15.

TABLE 8

| Component | Parts[1] |
|---|---|
| Plaster (CaSO$_4$.½ H$_2$O) | 500 |
| Anhydride II | 450 |
| Hydrated lime | 50 |
| Total Polymers (cellulose ether and polyacrylamide) | See Table 9 |
| Air entraining agent (sodium lauryl sulphate) | See Table 9 |

TABLE 8-continued

| Component | Parts[1] |
|---|---|
| Set retarder (citric acid) | 0.5 |

[1]Parts based on the total composition, not including added water.

TABLE 9

| | Sprayable Plaster | | |
|---|---|---|---|
| Property Observed | 16 (MHEC) | 17 (Invention) | 18 (Invention) |
| Plaster/water ratio[1] | 1.9 | 1.9 | 1.9 |
| Cellulose ether R (parts) | 1.51 | — | — |
| F (parts) | — | 1.45 | — |
| G (parts) | — | — | 1.46 |
| Polyacrylamide (parts)[2] | 0.08 | 0.08 | 0.08 |
| Air entraining agent[3] (parts) | 0.50 | 0.53 | 0.54 |
| Appearance | smooth | smooth | smooth |
| Workability | good | excellent | excellent |
| Spreading value (cm) | 16.7 | 16.3 | 15.9 |
| Paste density (g/cc) | 1.61 | 1.59 | 1.60 |
| Air content (%) | 7.3 | 7.5 | 7.5 |
| Water loss (mg after 3 min.) | 2210 | 1345 | 2915 |

[1]Ratio of plaster (by weight)/added water (by weight).
[2]Nonionic polyacrylamide having a 1% solution viscosity of 800 mPas.
[3]Sodium lauryl sulphate.

The above results show that this invention provides excellent workability in sprayable plasters. All other properties were similar, except water loss. Best water loss was obtained with cellulose ether F, which has a higher 3-butoxy-2-hydroxy propyl D.S. than cellulose ether G, which shows the importance of hydrophobicity.

EXAMPLES 19 TO 21

These samples are directed to a comparison of plaster glues. Plaster glues are very pure, finely ground plaster of Paris used to glue plaster blocks together. The formulations used are shown in Table 10.

Appearance and consistency were measured by visual observation. Flexural strength and compressive strength were measured in a way similar to ASTM C348 and ASTM C108-80, respectively. Adhesion strength was measured after 7 days as described with respect to examples 1 to 6. The metal disc was glued onto a circular area of 5 cm diameter, which was made with a hollow bit, into a layer of glue applied on a plaster block.

The results are show in Table 10 below.

TABLE 10

| | Adhesive Plaster | | |
|---|---|---|---|
| Property Observed | 19 (HEHPC) | 20 (Invention) | 21 (MHEC) |
| Plaster of Paris (CaSO$_4$.½ H$_2$O) (parts)[1] | 1000 | 1000 | 1000 |
| Cellulose ether | | | |
| A (parts)[1] | 1 | — | — |
| H (parts)[1] | — | 0.8 | — |
| R (parts)[1] | — | — | 1.2 |
| Set retarder (parts)[1,2] | 0.1 | 0.1 | 0.1 |
| Water ratio applied[3] | 0.68 | 0.68 | 0.68 |
| Appearance | lumps | smooth | smooth |
| Consistency | weak | firm | firm |
| Flexural strength (N/mm$^2$) | — | 3.7 | 3.6 |
| Compressive strength (N/mm$^2$) | — | 8.9 | 8.3 |
| Adhesion strength | — | 46.8[4] | 46.8[4] |

TABLE 10-continued

| | Adhesive Plaster | | |
|---|---|---|---|
| Property Observed | 19 (HEHPC) | 20 (Invention) | 21 (MHEC) |
| (N/cm²) | | | |

[1] Parts measured by the weight of the total composition, not including added water.
[2] Citric acid.
[3] Ratio of amount of added water (by weight)/amount of mixture (by weight) (not including the added water).
[4] Failure of substrate.

The samples of this invention had improved appearance and consistency over sample 19 (HEHPC) properties, except that the strength of this invention was superior, even though the cellulose ether was present in a lower concentration.

EXAMPLE 22

This example demonstrates preparation of a joint cement using 3-butoxy-2-hydroxypropylhydroxyethycellulose per this invention. The sample had the formulation shown in Table 10. Limestone, clay, mica and cellulose ether were blended and shaken in a closed container. Water was placed in a Hobart N50 mixer. Binder was added to the water and mixed. The dry blend was then added to the liquid dispersion and mechanically mixed for 20 minutes.

Appearance was rated on a subjective scale from 1 to 5. A rating of 1 indicates that the sample was very smooth and creamy. A ratio of 5 would indicate extreme graininess.

Gelation was measured subjectively. No gelation would indicate the absence of any elastic properties ("structure"), whereas heavy gelation would mean that the paste was similar to a cooked starch pudding.

TABLE 11

| Joint Cement | |
|---|---|
| | 22 (Invention) |
| Limestone (wt %) | 58.6 |
| Attapulgite clay (wt %) | 2.0 |
| Binder² | 1.5 |
| Mica (wt %) | 3.0 |
| Cellulose ether F (wt %) | 0.4 |
| Water (wt %) | 34.5 |
| Viscosity (BU)¹ | 600 |
| Appearance | 1 |
| Gelation | very slight |

[1] Viscosity according to ASTM C474-67.
[2] Polyvinylacetate emulsion internally plasticized with 10% dibutylphthalate sold under the trade name Ucar 131 by Union Carbide Corporation.

Appearance was excellent, whereas gelation was very slight.

While the invention has been described with respect to specific embodiments, it should be understood that they are not intended to be limiting and that many variations and modifications are possible without departing from the scope of this invention.

I claim:

1. Nonionic, water-soluble 3-alkoxy-2-hydroxypropyl hydroxyethylcellulose comprising 0.05 to about 50%, based on the weight of the substituted hydroxyethylcellulose, of at least one 3-alkoxy-2-hydroxypropyl group wherein the alkyl moiety is a straight or branched chain alkyl group having 2 to 6 carbon atoms.

2. The nonionic, water-soluble 3-alkoxy-2-hydroxypropylhydroxyethylcellulose of claim 1 having a hydroxyethyl M.S. of from about 1.5 to about 3.5.

3. The nonionic, water-soluble 3-alkoxy-2-hydroxypropylhydroxyethylcellulose of claim 1 wherein the alkyl moiety is a straight chain alkyl group.

4. The nonionic, water-soluble 3-alkoxy-2-hydroxypropylhydroxyethylcellulose of claim 2 wherein the alkyl moiety is a straight chain alkyl group.

5. The nonionic, water-soluble 3-alkoxy-2-hydroxypropylhydroxyethylcellulose of claim 1 substituted with 0.1 to 25% of one 3-alkoxy-2-hydroxypropyl group.

6. The nonionic, water-soluble 3-alkoxy-2-hydroxypropylhydroxyethylcellulose of claim 2 substituted with 0.1 to 25% of one 3-alkoxy-2-hydroxypropyl group.

7. The nonionic, water-soluble 3-alkoxy-2-hydroxypropylhydroxyethylcellulose of claim 3 substituted with 0.1 to 25% of one 3-alkoxy-2-hydroxypropyl group.

8. The nonionic, water-soluble 3-alkoxy-2-hydroxypropylhydroxyethylcellulose of claim 4 substituted with 0.1 to 25% of one 3-alkoxy-2-hydroxypropyl group.

9. The nonionic, water-soluble 3-alkoxy-2-hydroxypropylhydroxyethylcellulose of claim 1 having a degree of polymerization of from about 1500 to about 4000.

10. The nonionic, water-soluble 3-alkoxy-2-hydroxypropylhydroxyethylcellulose of claim 2 having a degree of polymerization of from about 1500 to about 4000.

11. The nonionic, water-soluble 3-alkoxy-2-hydroxypropylhydroxyethylcelluose of claim 3 having a degree of polymerization of from about 1500 to about 4000.

12. The nonionic, water-soluble 3-alkoxy-2-hydroxypropylhydroxyethylcellulose of claim 6 having a degree of polymerization of from about 1500 to about 4000.

13. The nonionic, water-soluble 3-alkoxy-2-hydroxypropylhydroxyethylcellulose of claim 8 having a degree of polymerization of from about 1500 to about 4000.

14. The nonionic, water-soluble 3-alkoxy-2-hydroxypropylhydroxyethylcellulose of claim 1 wherein the alkyl group is an n-butyl group.

15. The nonionic, water-soluble 3-alkoxy-2-hydroxypropylhydroxyethylcellulose of claim 14 having a hydroxyethyl M.S. of from about 1.5 to about 3.5.

16. The nonionic, water-soluble 3-alkoxy-2-hydroxypropylhydroxyethylcellulose of claim 14 substituted with 0.1 to 25% of one 3-alkoxy-2-hydroxypropyl group.

17. The nonionic, water-soluble 3-alkoxy-2-hydroxypropylhydroxyethylcellulose of claim 15 substituted with 0.1 to 25% of one 3-alkoxy-2-hydroxypropyl group.

18. The nonionic, water-soluble 3-alkoxy-2-hydroxypropylhydroxyethylcellulose of claim 14 having a degree of polymerization of from about 1500 to about 4000.

19. The nonionic, water-soluble 3-alkoxy-2-hydroxypropylhydroxyethylcellulose of claim 15 having a degree of polymerization of from about 1500 to about 4000.

20. The nonionic, water-soluble 3-alkoxy-2-hydroxypropylhydroxyethylcellulose of claim 16 having a degree of polymerization of from about 1500 to about 4000.

21. The nonionic, water-soluble 3-alkoxy-2-hydroxypropylhydroxyethylcellulose of claim 17 having a degree of polymerization of from about 1500 to about 4000.

* * * * *

UNITED STATES PATENT AND TRADEMARK OFFICE
CERTIFICATE OF CORRECTION

PATENT NO. : 4,845,207
DATED : July 4, 1989
INVENTOR(S) : t'Sas

It is certified that error appears in the above-identified patent and that said Letters Patent is hereby corrected as shown below:

Column 7, lines 32 and 33;

"methylhydroxyethylecllulose"   should read   --methylhydroxyethylcellulose-- .

Column 8, Table 4 - Under Table Headings 11 and 12;

```
      11        12                         11         12
"(Invention)         "   should read   --(Invention)  (MHPC) -- .
   (MHPC)
```

Signed and Sealed this

Seventeenth Day of April, 1990

Attest:

HARRY F. MANBECK, JR.

Attesting Officer

Commissioner of Patents and Trademarks